G. B. BOYER.
APPARATUS FOR SPROUTING GRAIN.
APPLICATION FILED AUG. 11, 1913.
1,124,844.
Patented Jan. 12, 1915.
2 SHEETS—SHEET 1.
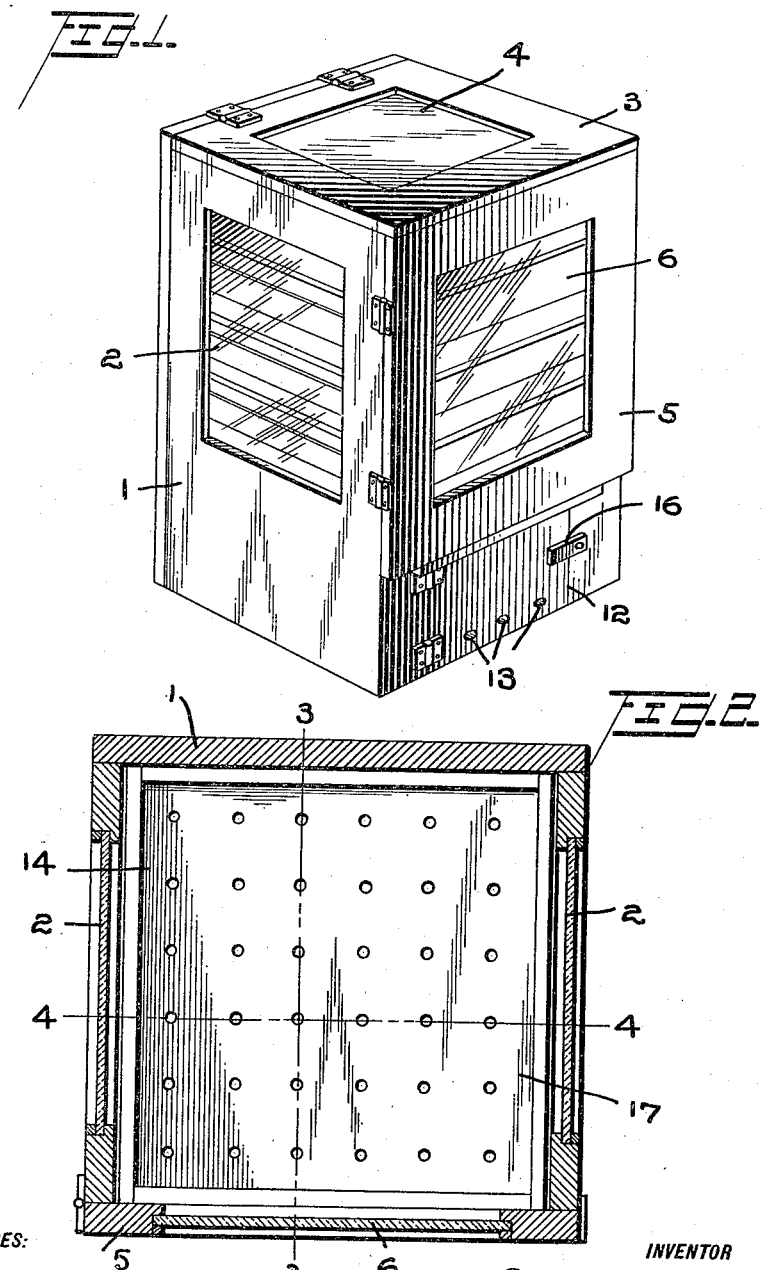

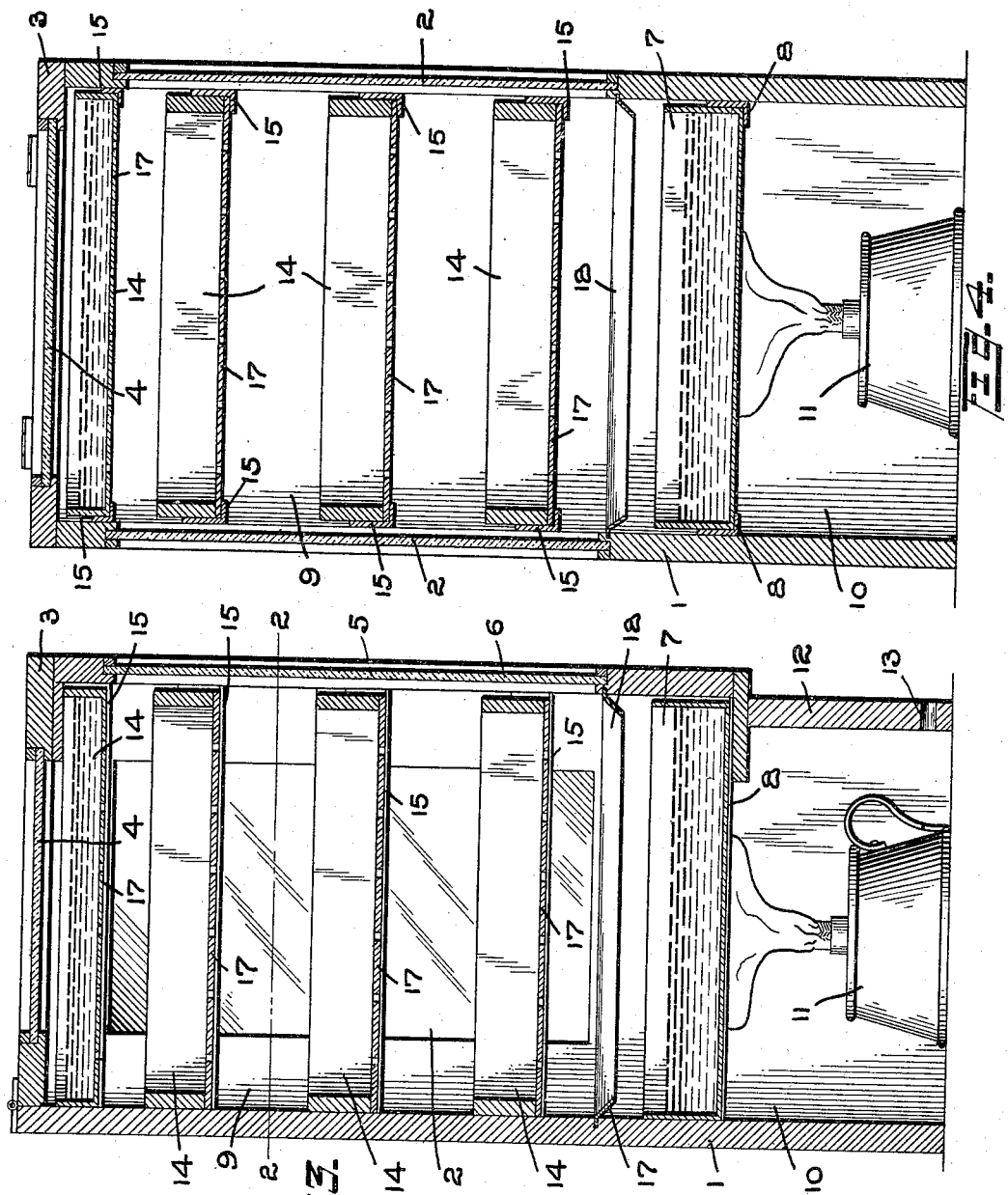

UNITED STATES PATENT OFFICE.

GEORGE B. BOYER, OF LANSDALE, PENNSYLVANIA.

APPARATUS FOR SPROUTING GRAIN.

1,124,844. Specification of Letters Patent. Patented Jan. 12, 1915.

Application filed August 11, 1913. Serial No. 784,052.

*To all whom it may concern:*

Be it known that I, GEORGE B. BOYER, a citizen of the United States, residing at Lansdale, in the county of Montgomery and State of Pennsylvania, have invented certain new and useful Improvements in Apparatus for Sprouting Grain, of which the following is a specification.

My invention relates to improvements in apparatus for sprouting grain, the object of the invention being to provide an improved apparatus of this character which will maintain the grain in a warm moist condition subjected to the light of the sun, so that the grain will quickly sprout and the sprout will be green and provide an excellent food for poultry.

A further object is to provide an improved apparatus in which the condensed liquid within the apparatus is returned to the supply tank and again vaporized so that the operation is a continuous one and the grain is kept moist and warm until thoroughly sprouted.

With these and other objects in view, the invention consists in certain novel features of construction and combinations and arrangements of parts as will be more fully hereinafter described and pointed out in the claims.

In the accompanying drawings: Figure 1 is a perspective view illustrating my improved apparatus. Fig. 2 is a view in horizontal section on an enlarged scale on the line 2—2 of Fig. 3. Fig. 3 is a view in vertical section on the line 3—3 of Fig. 2, and Fig. 4 is a view in vertical section on the line 4—4 of Fig. 2.

1 represents a rectangular casing having windows 2 at its sides and provided with a hinged top 3 also having a window 4 therein as clearly shown. A hinged door 5 normally closes the front of the casing, and this door 5 is likewise provided with a window 6.

It will be observed that all of the windows are in the upper portion of the casing above a removable water tank 7 which latter is supported to slide upon angle guides 8, and is readily removable when the door 5 is opened. This tank 7 acts also as a partition to divide the casing into an upper grain compartment 9 and a lower lamp compartment 10. In this lower compartment 10, any ordinary form of lamp or heater 11 may be located and may be readily positioned within the casing when a hinged door 12 in front of the casing is open.

The door 12 is preferably provided with draft inlets 13, and with a fastening device 16, so that it may be locked in closed position.

Within the grain compartment 9, a plurality of trays 14 are supported to slide on angle guides 15, and may be removed when the door 5 is opened. These trays 14 have perforated bottoms 17, so that liquid accumulating in one tray will flow through to the tray below, and the uppermost tray is preferably smaller than the others and may be used either for the grain or for liquid to spray the grain in the trays below. Each tray will contain its proper quota of grain which is thoroughly moistened and which is maintained in a moistened condition by reason of the vapor rising from the heated water in tank 7. This vapor passes around the trays, condenses in the bottom of the trays and falls onto the grain in the trays. A certain amount of the vapor will condense against the sides and windows of the casing and will flow downwardly and be deflected by inclined flanges 18 into the tank 7. In other words, all of the sides, as well as the door 5, are provided with these flanges 18 to direct the water back into the tank. By reason of the fact that the cover or top 3 is hinged, additional water may be readily supplied to the upper tray 14 whenever desired, and as this cover, as well as the sides of the casing and the door 5 are provided with windows, the rays of the sun may have access to the interior of the casing and to the moist grain, not only causing the latter to sprout, but also to give to the sprout a natural green color. This would not be true if the grain sprouted without the sun's rays, and hence the windows in the apparatus permit an improved result in the sprouting of the grain.

It will be observed that as the windows in the sides and in the door 5 are of appreciably less thickness than said sides and door, ample space is provided around three sides of the trays for the passage of vapor and for the return of liquid of condensation. Furthermore, the windows permit a ready inspection of the grain, so that it is not necessary to open the door to find out the condition of the same.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. An apparatus for sprouting grain, comprising a rectangular casing consisting of a back, and sides secured to the back, said sides having windows therein, a front door hinged to one of the sides and having a window therein, a hinged top having a window therein, said sides having guides thereon, perforated trays on the guides fitting within the casing, a tank in the lower portion of the casing adapted to contain water, and said windows in the sides and in the front located outside of the plane of the inner surfaces of said sides, whereby the vapor from the tank may pass upwardly and around all of said trays and commingle with the contents of the trays, and an inclined flange below the lowermost tray adapted to direct the water falling thereupon into the tank, substantially as described.

2. An apparatus for sprouting grain, comprising a rectangular casing consisting of a back, and sides secured to the back, said slides having windows therein, a front door hinged to one of the sides and having a window therein, a hinged top having a window therein, said sides having guides thereon, perforated trays on the guides fitting within the casing, a tank in the lower portion of the casing adapted to contain water, and said windows in the sides and in the front located outside of the plane of the inner surfaces of said sides, whereby the vapor from the tank may pass upwardly and around all of said trays and commingle with the contents of the trays, an inclined flange below the lowermost tray adapted to direct the water falling thereupon into the tank, a perforated tray in the extreme top of the casing having a perforated bottom and adapted to contain water and feed the same downwardly onto the uppermost tray, all of said first-mentioned trays having perforated bottoms, whereby the water may find its way through the trays from upper trays into those below, substantially as described.

In testimony whereof I have signed my name to this specification in the presence of two subscribing witnesses.

GEORGE B. BOYER.

Witnesses:
GEO. F. SCHWENK,
CHAS. G. SCHWENK.

Copies of this patent may be obtained for five cents each, by addressing the "Commissioner of Patents, Washington, D. C."